Dec. 29, 1925.

T. B. MUNROE 1,567,289

MACHINE FOR CUTTING SHEETS INTO SUITABLE LENGTHS AND WIDTHS

Filed March 3, 1923

Inventor

T. B. Munroe

By F. A. Witherspoon

Attorney

Dec. 29, 1925.                                                                      1,567,289
T. B. MUNROE
MACHINE FOR CUTTING SHEETS INTO SUITABLE LENGTHS AND WIDTHS
Filed March 3, 1923                    6 Sheets-Sheet 3

Inventor
T. B. Munroe
By

Attorney

Dec. 29, 1925.
T. B. MUNROE
1,567,289
MACHINE FOR CUTTING SHEETS INTO SUITABLE LENGTHS AND WIDTHS
Filed March 3, 1923
6 Sheets-Sheet 5

Inventor
T. B. Munroe
By F. A. Witherspoon
Attorney

Patented Dec. 29, 1925.

1,567,289

UNITED STATES PATENT OFFICE.

TREADWAY B. MUNROE, OF FOREST GLEN, MARYLAND.

MACHINE FOR CUTTING SHEETS INTO SUITABLE LENGTHS AND WIDTHS.

Application filed March 3, 1923. Serial No. 622,577.

*To all whom it may concern:*

Be it known that I, TREADWAY B. MUNROE, a citizen of the United States, residing at Forest Glen, in the county of Montgomery and State of Maryland, have invented certain new and useful Improvements in Machines for Cutting Sheets into Suitable Lengths and Widths; and I do hereby declare the following to be a full, clear, and exact description of the invention, such as will enable others skilled in the art to which it appertains to make and use the same.

This invention relates to machines for cutting a traveling wide sheet of material into smaller sheets or boards of suitable lengths, and widths, and has for its object to provide a mechanism of this character which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1ª, Sheet 2, is the other half of Figure 1;

Figure 11ª is a plan view of that portion of the machine shown in Figure 1ª;

Figure 13ª, Sheet 5, is the other portion of Figure 13;

Figure 14ª is the other portion of Figure 14.

In order that the precise invention may be the more clearly understood, it is said: At present there is being manufactured what are known on the market as "Celotex" boards, which are made from bagasse fibers, and are used as a heat insulator and also as a substitute for lumber. The original sheets from which these Celotex boards are cut are formed on a machine somewhat resembling a paper making machine, and these "Celotex" sheets are continuously fed from this last named machine over a drying apparatus, so that by the time they are dry enough to cut up into boards they may be say 800 feet long, and say 10 feet or 12 feet wide. The sheets are say from ¼ to ½ inch thick, and the Celotex boards derived from the sheets are cut or sawed by this invention into lengths of say about 10 feet and widths of about 4 feet.

Figures 1, 2, 3, 4, 5:
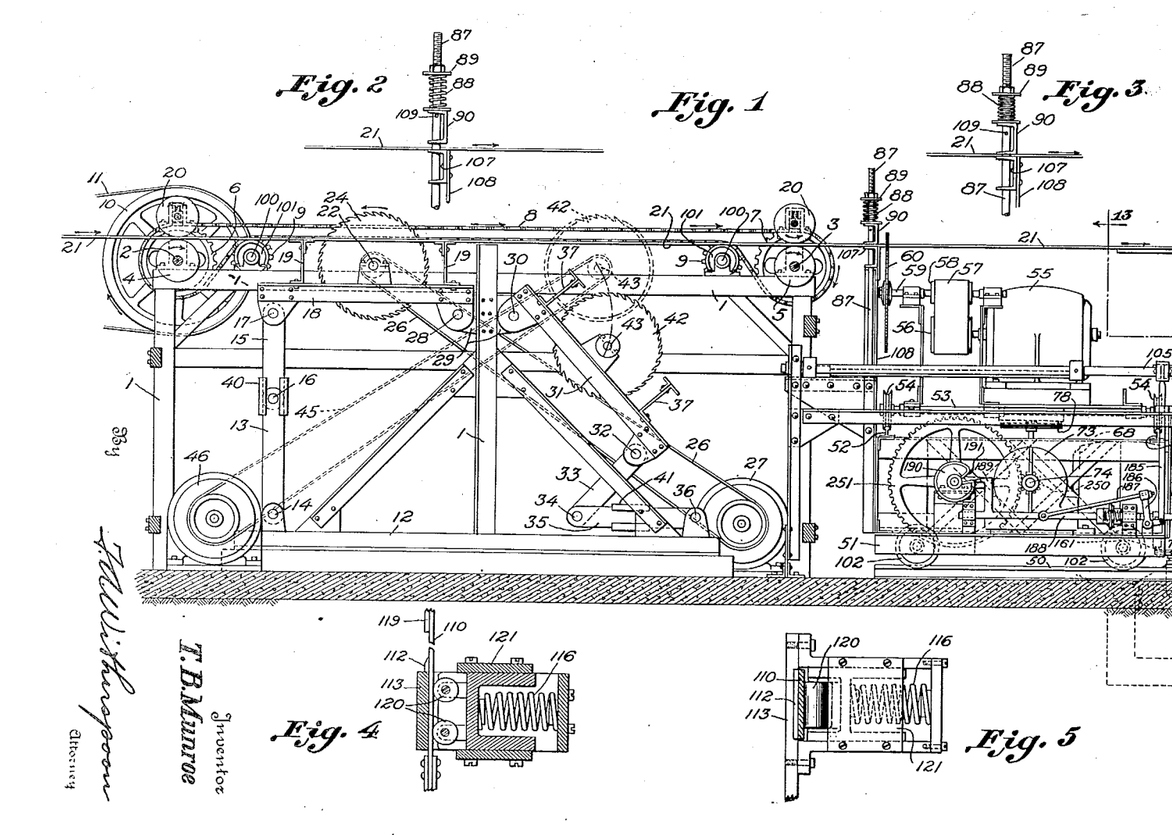
Figure 1 is a side elevational view, partially in section, of a portion of a machine made in accordance with this invention.
Figure 2 is a view of the clamping means for the traveling sheet, detached from the machine, showing the parts in their open position.
Figure 3, Sheet 1, shows the parts of Figure 2 in their closed position.
Figure 4 is a vertical sectional view of the target releasing device.
Figure 5 is a plan view of the parts shown in Figure 4.
Figure 11:
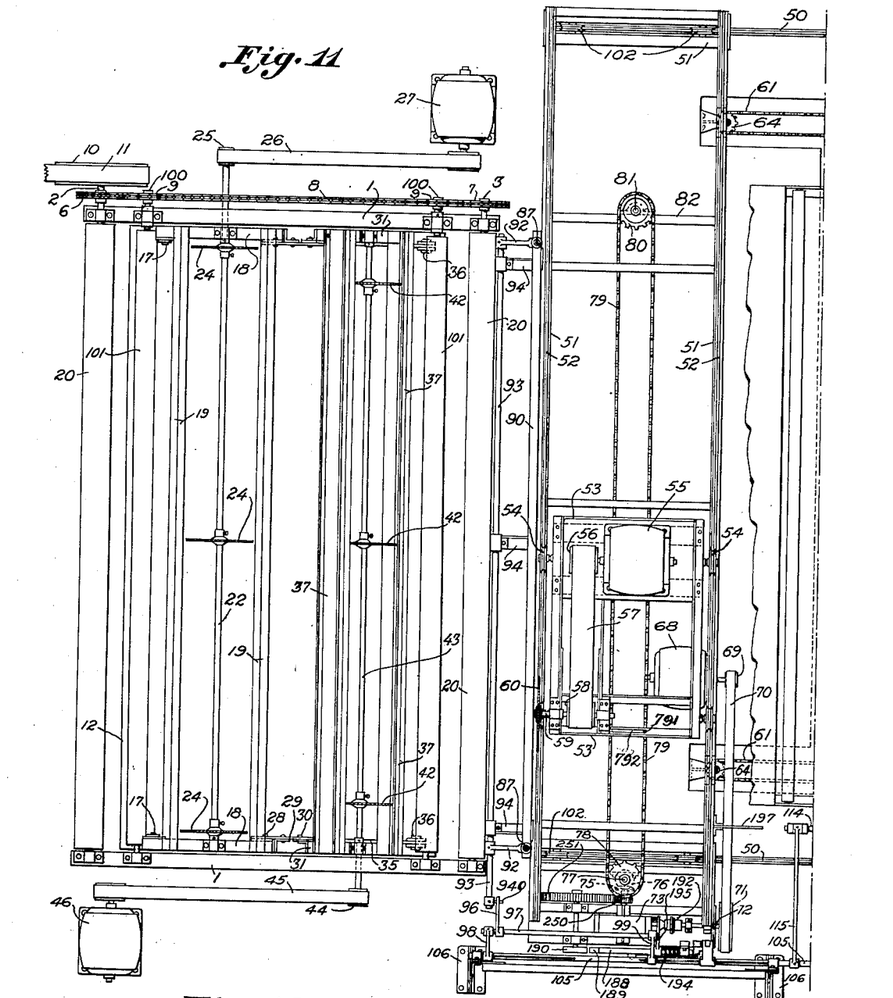
Figure 11 is a plan view of that portion of the machine illustrated in Figure 1.
Figure 11A:
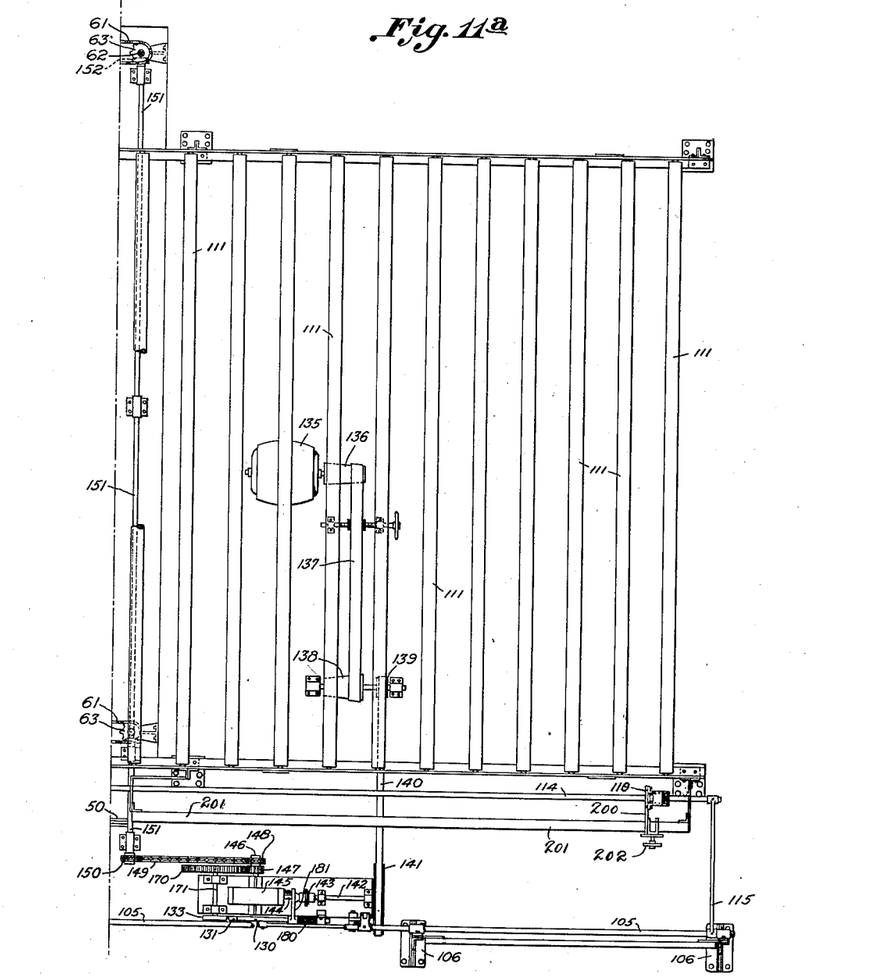

Referring more particularly to Figures 1 and 1ᵃ and 11 of the drawings, the numeral 1 indicates any suitable frame work on which are mounted the shafts 2 and 3 carrying the driving rollers 4 and 5 rigid with the sprocket wheels 6 and 7 respectively. 8 indicates a sprocket chain driving said wheels and 9 sprockets mounted on the shafts 100 carrying the idler rollers 101. The shaft 2 is rigid with the driving pulley 10, over which passes the belt 11 driven by a motor not shown.

As best illustrated in Figures 1 and 11, there is mounted on the machine a base frame 12 having a pair of standards 13 (only one shown) pivoted at 14 and a pair of links 15 (only one shown), pivoted to standards 13 as at 16. To the links 15 there is pivoted as at 17 a pair of supporting members 18, see Figure 11, having the guide members 19 rigid therewith.

Between the driving rollers 4 and 5 and their companion rollers 20 and over said guide members 19, passes the Celotex sheet 21 to be cut into suitable lengths and widths as above stated.

As will be clear from Figure 11, the guides 19 extend across the width of the entire machine, and between them carried by the pair of supports 18 is a shaft 22, on which is mounted a plurality of saws 24 adjustable longitudinally of the shaft. Said shaft 22 is provided with a driven pulley 25 over which passes the belt 26 driven by the motor 27. Also pivoted to the pair of supports 18 as at 28 are a pair of web supports 29, which webs are rigid with the standard or frame 1, but are pivoted as at 30 to the supports 31, pivoted as at 32 to the links 33, which in turn are pivoted as at 34 to the standards 35 pivoted at 36 to the base 12. The locking members 40 and 41 are used at the pivots 16 and 34 respectively to hold the parts rigidly together. That is, for purposes to be described below, the parts 31 to 35 may be straightened up so as to cause the supports 31 to occupy a horizontal position, and in such cases the locking member 41 is slipped over the pivot 34 to stiffen the members 33 and 35, while the locking member 40 is slipped down from the pivot 16 to release the members 15 and 13, to permit the members 18 and saws 24 to be moved down below the topmost frame member.

When the members 31 are thus brought up into their horizontal position, the guide members 37 carried by said members 31 are likewise brought into horizontal positions similar to the positions occupied by the guide members 19, so that the traveling sheet 21 will be supported thereby, and the saws 42 will be brought from the full line position shown in Figure 1 to the dotted line position shown in said figure. Said saws 42 are carried on the horizontal shaft 43, which is in all respects similar to the shaft 22 and is mounted on the supporting members 31 as shown. Said shaft 43 is provided with the power pulley 44 over which passes the drive belt 45 which is operated by the motor 46, as will be readily understood from the drawings.

From what has now been disclosed, it will be readily understood that as the Celotex sheet 21 is moved in the direction of the arrow from left to right as seen in Figure 1, it will move over the driving rollers 4 and 5 and under the spring controlled pressure rollers 20. It will also move over the idler rollers 101 on shafts 100, as well as over the web supports 19. Either the set of saws 24 or the set of saws 42 will split the said sheet into a plurality of strips designated by the numerals 47 in Figure 12. These said strips, however, if they extended the entire length of the sheet 21 would be many hundreds of feet long, and therefore they must be cut into suitable lengths. In order to accomplish this, another mechanism now to be disclosed is provided. This said mechanism is also best illustrated in Figures 1 and 11. It consists of a track or a pair of rails 50 on which reciprocates the lower carriage 51; and on this lower carriage are mounted the cross rails 52 on which reciprocates an upper traversing carriage 53 having wheels 54 traveling on said cross rails 52. Mounted on the traversing carriage 53 is a motor 55, having a power pulley 56 driving the belt 57 taking over the pulley 58, rigid with the shaft 59 on which is mounted the traversing saw 60, rotating across the path of travel of the sheet 21, all as plainly shown in Figures 1 and 11.

Figures 1A, 6, 7, 8, 9, 10:
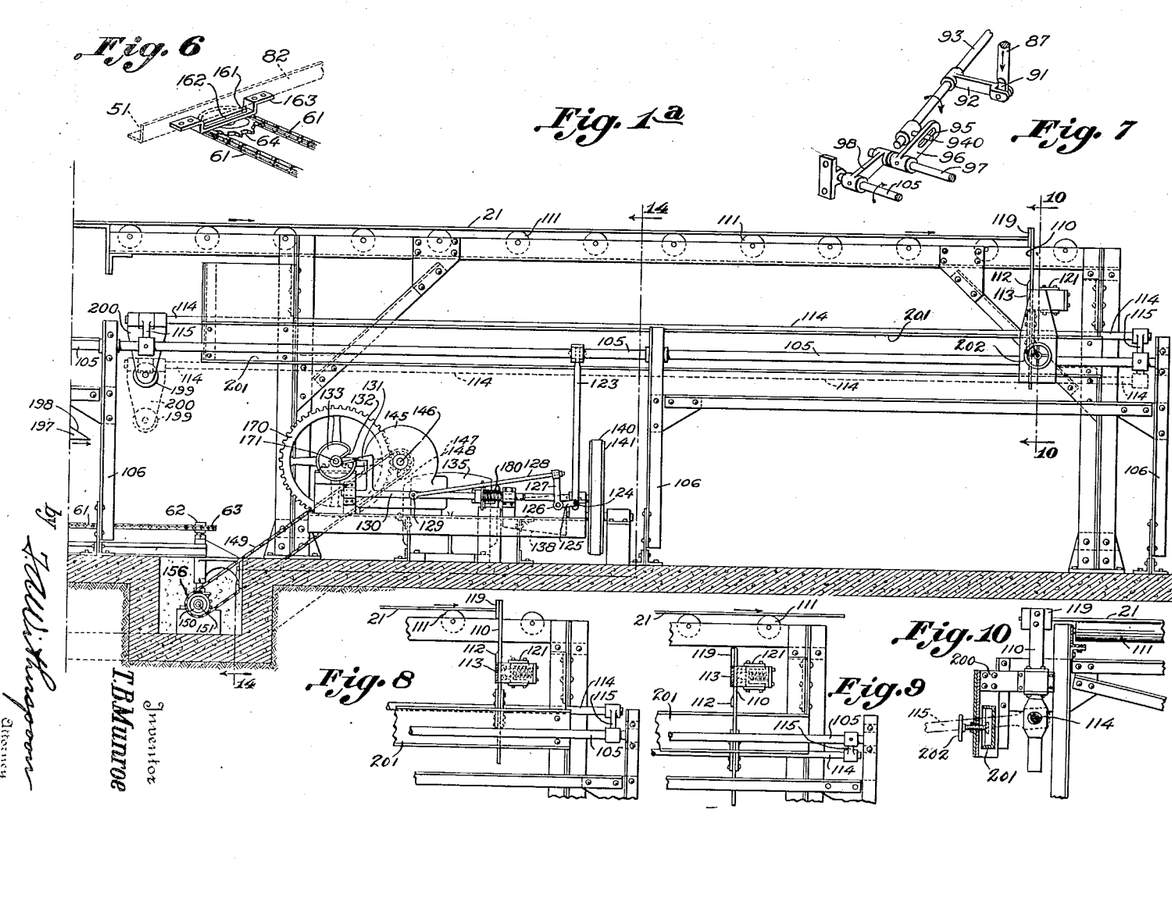
Figure 6, Sheet 2, is a fragmentary view of the chain conveying means for the lower carriage of the traversing saw.
Figure 7 is a detail perspective view of the devices for raising and lowering the clamping means shown in Figures 2 and 3.
Figure 8 is a fragmentary side view of the target in its raised position.
Figure 9 is a view of the parts shown in Figure 8 when in their lowered positions.
Figure 10 is a transverse sectional view taken on the line 10—10 of Figure 1ª, showing the target in its raised position.

The carriage 51 mounted on the wheels 102 is reciprocated under the sheet 21 by means of the pair of sprocket chains 61, driven by the vertical shafts 62, carrying sprocket wheels 63, and passing around a pair of sprocket wheels 64 rigid with said carriage 51, as best shown in Figures 1, 1ᵃ, 6, 11 and 11ᵃ, and as will be more fully disclosed below.

Figure 12:
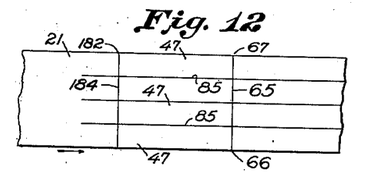
Figure 12 is a plan view of a portion of the traveling sheet illustrating the longitudinal slits and the cross cuts that are imparted thereto.
Figure 13:
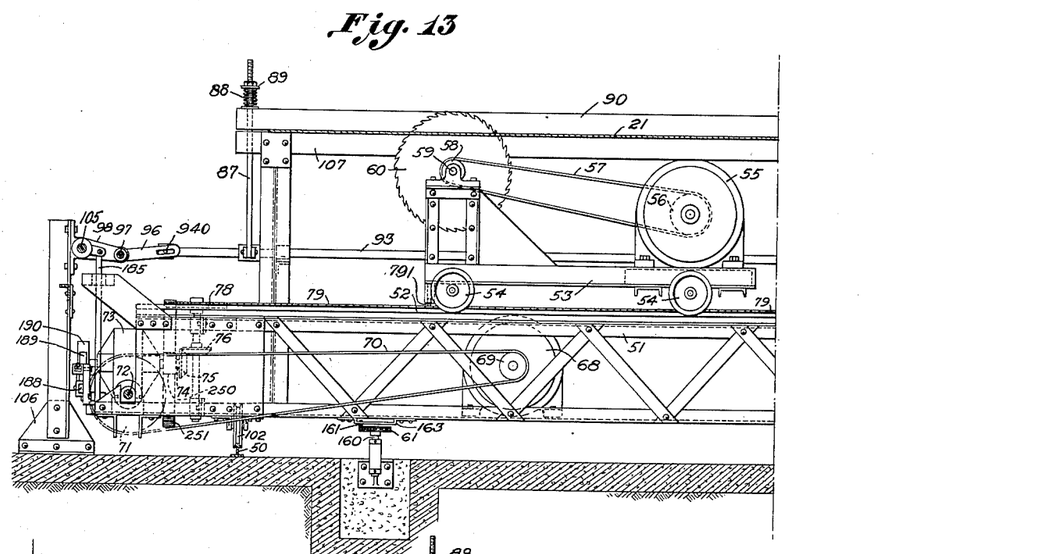
Figures 13, Sheet 5, is a portion of a transverse sectional view, taken on the line 13—13 of Figure 1, looking in the direction of the arrows.
Figure 13A:
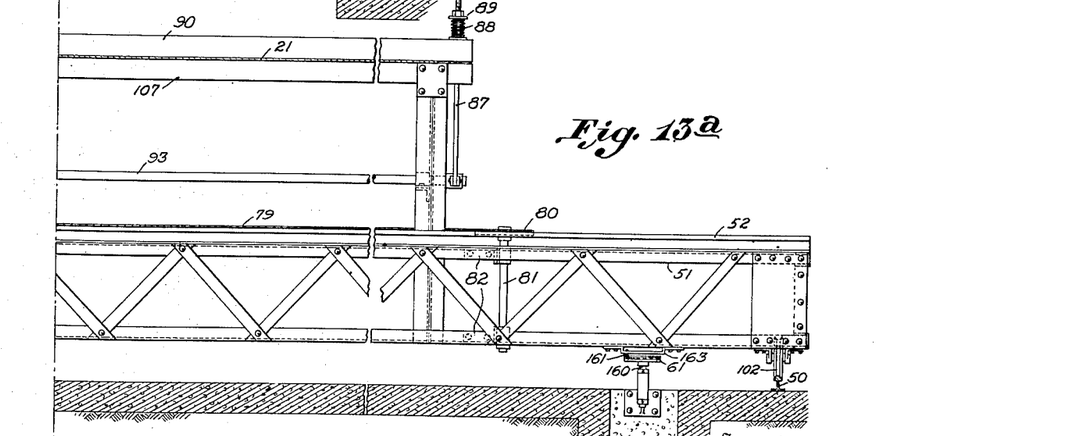

The parts are so timed that the lower carriage 51 moves with the same speed as does the sheet 21, so that the traversing saw 60 travels to the right bodily with said carriage 51, as seen in Figure 1, with the same speed as does said sheet 21, and therefore it is enabled to make a cut indicated by the line 65, Figure 12, across the strips 47 without binding against the oncoming sheet 21, as will be readily understood. In the meantime, the traversing saw 60 must be given a motion transversely of the sheet 21 at such a speed that by the time the said traversing saw has bodily moved in the direction of travel of the sheet 21 a distance equal to the travel of the carriage 51, it will have completely severed all of the strips 47 of the sheet 21, or have traveled from the edge 66 of said sheet 21, entirely through said sheet and have cleared the other edge 67 of said sheet. This transverse speed of the saw 60 is governed by the motor 68 provided with a power pulley 69 over which passes the belt 70, driving the pulley 71 rigid with the shaft 72, which is shown in Figures 1, 11 and 13, as entering the gear box 73. Said gear box is provided with a shaft 74, provided with the beveled gear 75, meshing with a gear 76 rigid with the vertical shaft 77 carrying the sprocket wheel 78, around which passes the sprocket chain 79, as best shown in Figures 11 and 13. Said sprocket chain further passes around the guide sprocket 80, see Figure 11, mounted on the short shaft 81 rigid with the frame members 82, see Figures 11 and 13ª.

The sprocket chain 79 carries a pin 791, see Figures 11, 13 and 13ª, which plays in a slot 792 located in one of the side frame members of the carriage 53. It thus results that as the sprocket chain 79 revolves around its sprocket wheels 78 and 80, the pin 791 thereof will, through the slot 792, move the carriage 53 in a direction toward the sprocket 78, and it is evident that as the pin 791 never leaves the slot 792, said carriage 53 will continue to move toward the sprocket 78 until it reaches the end of its travel, or until said pin 791 revolves around said sprocket 78. While revolving around the sprocket 78 the pin 791 will slide toward the other end of the slot 792 and upon the continued travel of the said pin 791 with its sprocket chain 79, the carriage 53 will be moved reversely or in a direction toward the other sprocket 80. The movement of the carriage 53 will continue toward said sprocket 80 until it reaches the end of its travel, or until the pin 791 revolves around the sprocket 80. While so revolving about said sprocket 80, the pin 791 will slide toward the other end of the slot 792 and, upon the continued travel of said pin, move the carriage 53 again toward the sprocket 78, as heretofore described. Thus will the carriage 53 be reciprocated backwards and forwards across the path of the moving sheet of Celotex so long as the sprocket chain 79 is revolved about its sprockets 78 and 80.

As above intimated, the speed of the motor 68 is regulated to cause the sprocket chain 79 to move the saw 60 entirely across the width of the sheet 21, by the time the lower carriage 51 has completed its travel toward the right as seen in Figure 1. The saw 60 now being on the edge 67, of sheet 21, opposite the edge 66, it cuts back through said sheet to the edge 66 by the mechanism to be disclosed hereinafter.

From what has now been disclosed, it will be apparent that as the Celotex sheet is fed over the rollers 2 and 101, and over the guide supports 19, it is slit into a number of strips 47 depending upon the number of saws on the shaft 22 or 23 as the case may be. But should the widths of these strips have to be changed in order to fill a new order for boards, it would be an expensive procedure to stop the travel of the sheet 21 in order to adjust the saws 24, for that would involve the stopping of the sheet forming machine and the other machines feeding the latter. To avoid this delay and expense, the second set of saws 42 is provided and mounted as above disclosed, so that before the saws 24 have completed their work, one or more men may adjust the saws 42 along their shaft 43 to the proper intervals to cut the strips 47 of the new widths desired. This adjustment having been made, the locking member 40 is lowered from its position on pivot 16, and the saws 24 suddenly lowered beneath the top frame 1, while at the same time the saws 42 are suddenly raised from their full line positions shown in Figure 1 to their dotted line position shown in said figure. The locking member 41 is now applied to the joints 34 and the parts held firmly in place. The sheet 21 travels slowly so that this change of saws can be readily made and although there is a small amount of waste involved due to the loss of a few feet of material, yet this is negligible as compared to the relatively enormous cost that would be involved through a stopping of the travel of the sheet 21.

Further, it will be observed that as the traversing saw 60 must cut across the slits 85 separating the strips 47, Figure 12, it is very desirable to firmly hold these strips during this transverse cutting action. To accomplish this, the clamping mechanism illustrated in Figures 1, 2, 11 and 13, and 3, is provided. This mechanism comprises a pair of vertical members 87 provided with the springs 88 controlled by the nuts 89, and in turn controlling the slidable upper clamping jaw 90, extending between said members 87, as best shown in Figure 13.

The lower ends 91 of the members 87, as will be best understood from Figure 7, are pivoted to rocker arms 92 rigid with the rock shaft 93 supported from the brackets 94 moving with the lower carriage 51, as best shown in Figure 11. Said shaft 93 is provided on one end and with the rocking pin 940 passing through the slot 95 in the arm 96, rigid with the shaft 97 carried by the rocker arms 98 and 99, slidable on the splined rock shaft 105 mounted on the supports 106. The lower clamping members 107 are rigid with the supports 108 mounted on the carriage 51, and the vertically movable members 87 are provided with pins 109, adapted when said members are raised by the arms 92 into their upper positions to separate said clamping members 90 and 107 as best shown in Figure 2. On the other hand, when said members 87 are in their lower positions, the springs 88 will bring said clamping members together as shown in Figure 3.

The parts are so timed that when the saw 60 starts its cutting action from the edge 66 of the strip 21, the clamping members 90 and 107 are in their closed position, and these said members firmly hold the strips 47 in close proximity to the saw and thus insure a clean smooth cut of the porous Celotex material.

It will be understood of course that these clamping members and their associated parts including the shaft 93, arm 96, shaft 97 and arms 98 and 99, move with the carriage 51, the arms 98 and 99 being capable of sliding along the shaft 105.

When the sheet 21 or rather the boards 47 into which it has been cut by the operations above described, reach the target 110 after passing over the rollers 111, see Figure 1ª, said target is tilted slightly toward the right in Figure 4. Said target is normally supported by the lug 112 resting on the upper edge of the stationary member 113, and is pulled in a downward direction by reason of the weight of the shaft 114, which is carried by the oscillating arms 115 rigid with the main rock shaft 105. That is, when the target is tilted by the sheet 21 and the supporting lug 112 leaves the upper edge of the support 113, the target drops from the position shown in Figure 8 to the position shown in Figure 9, and in so doing, allows the weight of the shaft 114 to carry downward the arms 115, thus turning the main rock shaft 105 which actuates the arms 98 and 99, and their coacting parts, including the clamping member 90. This said tilting movement of the target compresses the spring 116, see Figures 4 and 5, through pressure on the rollers 120 in the casing 121, and as soon as the lug 112 passes below the support 113 said spring forces the target in an opposite direction and causes the lug 119 to catch on the upper edge of said support 113, as plainly shown in Figure 9.

Figure 14:
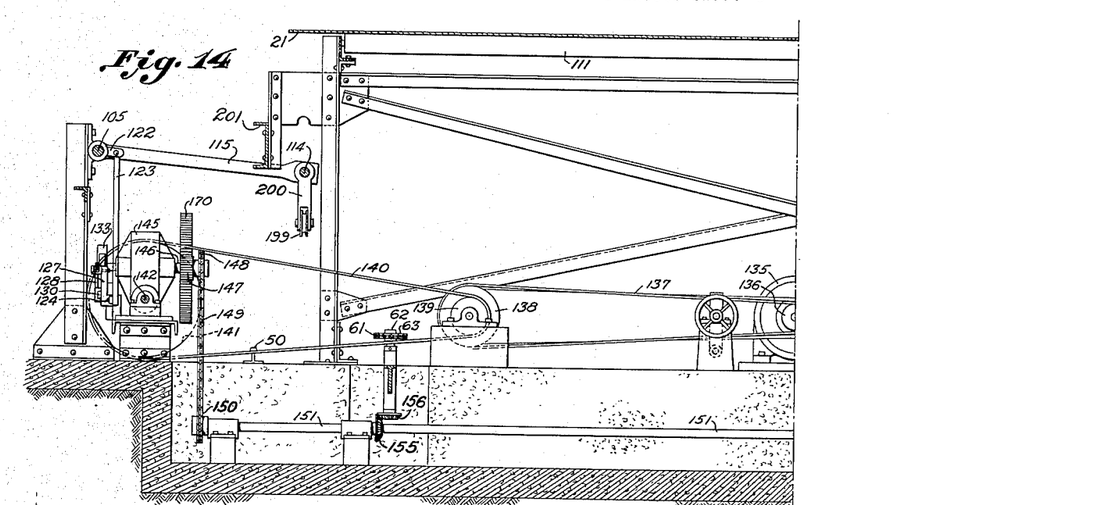
Figure 14, Sheet 6, is a portion of a transverse sectional view taken on the line 14—14 of Figure 1ª, looking in the direction of the arrows.
Figure 14A:
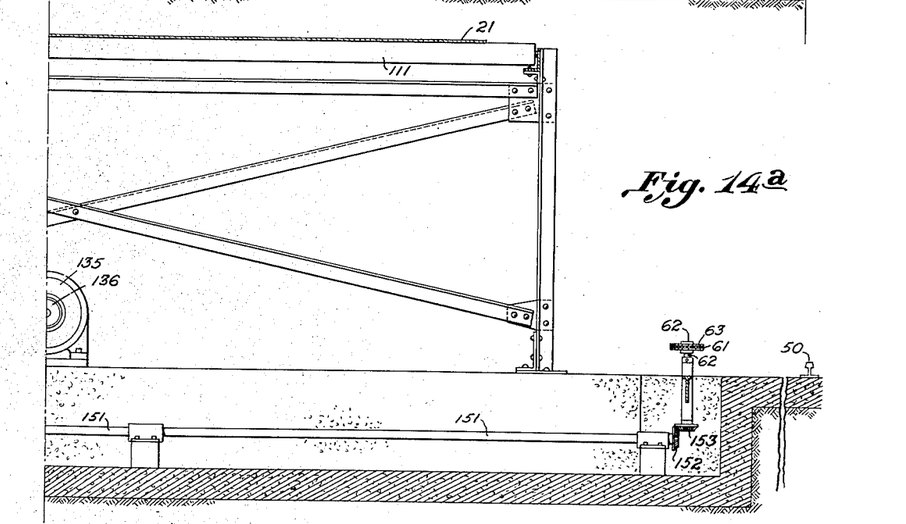

The rocking of the shaft 105 by the falling movement of the shaft 114 and arms 115 just described also rocks the arm 122, Figures 1ª and 14, and said arm imparts a reciprocating movement to the pitman 123 pivoted at 124 to the bell crank 125 pivoted as at 126, and whose arm 127 is slidably connected to the reciprocating member 128 pivoted as at 129 to the reciprocating latch member 130, provided with detent 131 adapted to enter the notch 132 with which the cam 133 is provided, all as will be clear from Figure 1ª.

Referring more particularly to Figures 11ª and 14, 135 represents a motor provided with the cone pulley 136, around which passes the belt 137, which also passes over the cone pulley 138, provided with power pulley 139, over which passes the belt 140, which likewise passes around the power pulley 141, and thus delivers power to the live shaft 142.

As best shown in Figure 11ª, the shaft 142 is cut and provided with a friction clutch 143 of any suitable type. The portion 144 of the said shaft 142 beyond the clutch 143 enters the gear box 145, which is of any suitable and well known construction, not shown, but which is provided with the usual gears adapted to transmit power to the shaft 146, and to the pinion 147 which is rigid with the sprocket 148 over which passes the sprocket chain 149, see also Figure 1ª. Said sprocket chain 149 also passes over the sprocket 150 rigid with the shaft 151 extending across the width of the machine, as clearly shown in Figures 11ª, 14 and 14ª, and provided at its far end with the beveled gear 152, and operating another bevel gear 153, rigid with the shaft 62 carrying the sprocket 63.

Referring to the same figures, it will be further observed that at the end of the shaft 151 nearest the power pulley 141 there is provided the beveled gear 155, meshing with the beveled gear 156, rigid with the other sprocket 63. The said pair of sprockets 63 carry the pair of sprocket chains 61, as above mentioned, as is clearly shown in the drawings.

As above stated, the pair of sprocket chains 61 pass around corresponding sprocket wheels 64, only one of which is shown in Figures 1, 6 and 13, but both of which are shown in Figure 11. Said pair of sprocket wheels 64, however, are supported on shafts 160, see Figures 1, 13, and 13ª, and each of the sprocket chains 61 carries a pin 161, best shown in Figure 6, which pins play in the slots 162 of a pair of brackets 163, best shown in said Figure 6. These said brackets 163 are rigid with the lower carriage 51, and are supported on the frame member 82 thereof. It thus results that as the sprocket chains 61 revolve around their corresponding sprocket wheels 63 and 64, the pins 161 thereof will through the brackets 163 move the carriage 51 toward the right, as seen in Figures 1 and 1ª, and it is evident that as the pins 161 never leave the slots 162 of the brackets 163, said carriage 51 will continue to move toward the right, as just disclosed, until it reaches the end of its travel, or until said pins revolve around the sprockets 63, shown in Figures 1ª and 11ª. When these said pins thus revolve around said sprockets 63, the return movement of said carriage 51 toward the left as seen in Figures 1 and 1ª will continue until the said pins 161 again revolve around the sprockets 64. Thus will the lower carriage 51 continuously reciprocate backwards and forwards, as long as the sprocket chains 61 are in motion.

But said sprocket chains 61 are driven from the shafts 62, rigid with the sprockets 153, and 156, meshing respectively with beveled gear 152 and 155, with which the shaft 151 is provided. Said shaft 151, as above stated, carries sprocket 150, see Figure 1ª, around which passes the sprocket chain 149, which, as above disclosed, passes around the sprocket 148 rigid with the shaft 146, which is driven from the shaft 142, in the manner above disclosed. Rigid with the shaft 146 is the pinion 147 above described, which meshes with the gear 170 mounted on the shaft 171, carrying the cam 133, disclosed above.

It will be remembered that the power from the main motor 135 is delivered to the shaft 142, see Figure 11ª, and through the clutch 143 to the pinion 147. Therefore, if the gear 170 and pinion 147 suddenly should be stopped, the power from shaft 142 would be cut off. In such case, as this said power passes through the friction clutch 143, one of the members of said clutch slips past the other member, when the parts are suddenly stopped, and therefore, the movement of the sprocket chains 61 and of the carriage 51 is likewise stopped. The stoppage of the carriage 51 in the manner just disclosed is accomplished as follows:

The sliding member 130 is provided with a spring 180, and the parts are so timed that when the carriage 51 is at the extreme left hand portion of its travel, as seen in Figures 1 and 1ª, said spring forces the detent 131 into the notch 132 of the cam 133, while at the same time through the arm 181, Figure 11ª, separates the members of the clutch 143 and thus cuts off the power from the live shaft 142. The parts are also so timed that this stoppage of the carriage 51 occurs at the moment the saw 60 reaches the point 182 on the edge 67 of the sheet 21 after having cut entirely through said sheet in the manner above disclosed. That is to say, the sheet 21 continuously moved forward, while the carriage 51 moves toward the left as seen in Figure 1, and by the time said carriage stops it has transported the saw 60 backwards relative to the motion of the sheet 21 until the point 182 is reached. When this occurs the line 65 or extreme end of the severed sheet 21 will have moved sufficiently forward over the roller 161 to have again reached and tripped the target 110. This second tripping of said target will now through the shaft 114 and connections 115, shaft 105, connections 122, 123, 125, 127 and 128 cause the withdrawal of the detent 131 from the notch 132 and the compression of the spring 180 through the arm 181, which in turn reengages the members of the clutch 143. The result is, power is immediately transmitted to the carriage 51 and it starts on its return movement toward the right, carrying the saw 60 with it.

In the meantime, the carriage 53 on which the saw 60 is mounted is automatically caused to begin its transverse movement from the edge 67 of the sheet 21 toward the edge 66 thereof, and to thus start the cutting of a line of transverse severings 184, Figure 12. This transverse or return movement of the saw 60 is accomplished as follows:

As will be clear from Figure 1, the shaft 105 is provided with a pitman 185, which is in all respects similar to the pitman 123, see Figure 1ª, and said pitman 185 is connected to a bell crank 186, and to a connecting rod 187, which in all respects is the same as the members 127 and 128, in Figure 1ª. Said connecting rod 187 is further joined to a slidable member 188, corresponding to the member 130, which is provided with the detent 189, coacting with the cam 190 having a notch 191 which is in all respects the same as the corresponding parts 131, 132, 133, in said Figure 1ª. In addition to this, as best shown in Figure 11, the live shaft 72 is provided with a clutch 192, corresponding to or identical with the clutch 143, and this said clutch is controlled by a spring 194, carried by the member 188 in the manner identical with the spring 180 and associated with said spring and clutch 192 is an arm 195 identical with the arm 181.

It thus results that as the shaft 105 is oscillated in the manner above disclosed, it not only serves to cut off and to cut in power from the live shaft 142, but it also cuts off and cuts in power from the live shaft 72. That is to say, the carriage 51 is reciprocated toward the right and back toward the left as seen in Figure 1, through the clutch 143 and its coacting parts, while the carriage 53 carrying the saw 60 is reciprocated in a direction at right angles to the reciprocations of the carriage 51, through an exactly similar control of the clutch 192, and its associated parts.

It therefore results that the parts are so timed that after the carriage 51 has experienced a dwell for a period sufficient to permit the extreme edge 65 of the sheet 21 to reach the target 110, or has traveled through a distance equal to that separating the lines 65 and 184 in Figure 12, the carriage 53 starts its return movement from the edge 67 of the sheet 21 toward the edge 66 thereof, and it reaches said edge 66 at the same time that the carriage 51 reaches the end of its movement toward the right as seen in Figure 1. When this occurs, the parts are further so timed that the members of the clutch 192 are disengaged and the carriage 53 dwells for a period of time equal to the period just disclosed, or until the carriage 51 has moved from its extreme right hand position back to its extreme left hand position, which is a period of time equal to the travel of the sheet 21 a distance separating the lines 65 and 184 in Figure 12. In the meantime, it will be apparent that the shaft, 105 having been turned only in one direction, it must be reset before it will be ready to complete its cycle of operation.

In order to accomplish this automatically, the carriage 51 is provided with a web 197 having an inclined surface 198 as best shown in Figures 1 and 1ª, and this said inclined surface 198 contacts with the depending roller 199 rigid with the shaft 114 through the connection 200, as best shown in Figures 1ª and 14. The contact pressure of the said surface 198 with the said roller 199 exerts a lifting action on the shaft 114, as will be clear from Figure 14, and thus resets the target 110 and carriage thereby, all as will be clear from the disclosures above. In the meantime, the target 110 has to be supported in its reset position, and this is accomplished due to the fact that the lug 112 has an upper inclined surface as illustrated in Figures 4 and 8, so that as it rises under the pressure of the spring 116, it readily slips over the top edge of the support 113 and regains the position shown in Figure 4.

As previously stated the sheet 21 of Celotex is continuously fed to this machine in a web of considerable width, which is split by the ripping saws 24 or 42 into strips. These strips however, must be transversely cut in order that the material may be handled and therefore the cross-cut saw 60 is reciprocated across the strips to divide the same into panels. It has been found in practice that builders and other users of Celotex desire this material in different sizes such as in widths of three or four feet and in lengths of ten, twelve, fourteen or sixteen feet. Thus it will be seen that the rip saws must be adjustable in order that orders for different widths may be filled with the least possible waste. It will further be seen that provision must be made whereby the strips 21 of Celotex may be cut by the cross-cut saw 60 so as to provide suitable lengths as called for in orders received.

In order to accomplish this result the target 110 is made adjustable. That is to say, the housing 121 see Figures 1ª, 10, 11ª and 14 is suitably mounted on a bracket 200 adapted to slide on the longitudinally extending guide member 201 rigid with the frame of the machine. Said bracket is further adapted to be clamped as by the screw means 202 to said guide member 201 which may be provided with suitable scale markings to represent lengths of boards. Thus it results that the target 110 carried by the housing 121 may be set at any desired position along the side of the machine and clamped there by means of the screw 202, whereupon boards of a certain length will be cut off by the cross-cut saw 60. Upon changing the position of the target 110 along the guide member 201 however, boards of a different length will be cut off by said saw 60.

The operation of this machine will be clear from the foregoing, but may be briefly summarized as follows: The fiber Celotex sheets 21 which may be say 12 feet wide and many hundreds of feet long are continuously fed between the rollers 4 and 20 in Figure 1, and moved slowly toward the right as seen in said figures until they pass between the rollers 5 and 20 and reach the target 110 as clearly shown in Figure 1ª. While these sheets 21 are thus traveling toward the target 110 the slitting saws 24 are cutting each sheet 21 into strips along the lines 85, as shown in Figure 12. These slits may be spaced different distances apart according to the particular adjustments of the saws 24 along their shaft 22 but when once adjusted, the slits 85 will be uniformly spaced apart to form the strips 47 of uniform width for the particular commercial order given for the boards being cut. On the other hand, as it would be expensive to stop the operation of the felting machine not shown but which is continuously making the sheets 21, it would be very costly to change the spacing of the slits 85 when a new order of material requiring different widths of strips 47 has been received. To avoid this expense, a second set of saws 42 are provided and are mounted on the movable support 31 and shaft 43. The mechanism is so arranged that when the material for a given order has been about completed, men go underneath the upper framework 1, Figure 1, and adjust the saws 42 along their shaft 43 to make slits 85 of such a spacing apart as would be required for the next order. Then when all is ready, and without stopping the travel of the sheets 21, the locking member 40 is taken off the joint 16, and the saws 22 are moved downwardly out of their cutting position beneath the upper frame work 1, while at the same time the saws 42 are moved upwardly into their dotted line position shown in Figure 1, and the locking member 41 is clamped over the joint 34 to hold the saws 42 in their new position. It thus results that only a few feet of the sheet 21 is destroyed, involving an inconsequential waste. The saws 42 then continue to cut the slits 85 at the desired new distances apart.

In order to produce the desired boards, the said strips 47, Figure 12, must be cut across transversely along the lines 65 and 184, shown in Figure 12. These boards may be say four feet wide and say, 8, 10 or 12 feet long, according to the demands of the customer. This cross cutting is accomplished by starting the saw 60 on one edge, say 66 of the sheet 21, and operating it through the motor 55 to cut entirely across said strips 47, while the carriage 51 is being moved in the manner above disclosed toward the right as seen in Figure 1, and at a speed equal to the travel of the sheet 21.

It thus results that while the saw 60 is traversing the width of the sheet 21, the carriage 51 moves to the extreme end of its travel toward the right, and the inclined surface 198 of the bracket 197 comes into contact with the roller 199, see Figure 14. When this happens, the shaft 114 and its supporting members 115 are lifted, thus rocking the shaft 105 and its arm 122, and thus raising the pitman connection 123. Said pitman connection, however, operates the bell crank 127, the end of which is free to slide along the connecting rod 128, toward the left as seen in Figure 1ª, and thus accomplishes nothing on this movement.

It will be observed that when the carriage 51 has traveled toward the right a distance equal to about one-half of the length of the board 47, it starts on its return movement and during this travel toward the right, the saw 60 completely traverses the board 21 along the line 65. On the other hand, the traversing movement of the saw 60 must be stopped while the carriage 51 is moving back toward the left to its initial position. In order to accomplish this power from the shaft 72, Figure 11, is cut off in the manner above disclosed, so that while the carriage 51 makes a to and fro movement the carriage 53 only makes a crosswise movement. The timing of the parts to accomplish this is effected through the relative sizes of the pinion gear 250 and the larger companion gear 251, see Figures 1 and 11. Otherwise the operation of cams 190 and 133 are similar as well as the operation of the detents 189 and 131, and their coacting parts all as above disclosed. It of course will be understood that the detents 131 and 189 are retracted from their respective notches 132 and 191 when the target is tripped. Further, it will be clear from the disclosure above that as the saw 60 begins its motion across the sheet 21 the clamping members 90 and 107 are so operated as to firmly clamp the strips of the sheet 21 and thus hold them firmly to the action of the saws, in the manner above stated.

It is obvious that those skilled in the art may vary the details of the construction as well as the arrangement of the parts without departing from the spirit of the invention, and therefore I do not wish to be limited to the above disclosure except as may be required by the claims.

What is claimed is:

1. In a machine for cutting continuously moving material the combination of a clamp; a transversely movable cutting means adapted to cut said material adjacent said clamp into predetermined lengths; and means actuated by said material for moving said cutting means and actuating said clamp.

2. In a machine for cutting continuously moving material the combination of a clamp; a transversely movable cutting means adapted to cut said material adjacent said clamp into predetermined lengths; and means actuated by said material for moving said cutting means in the direction of travel of said material and actuating said clamp.

3. In a machine for cutting continuously moving material the combination of a clamp; a transversely movable cutting means adapted to cut said material adjacent said clamp into predetermined lengths; means actuated by said material for moving said cutting means in the direction of travel of said material and actuating said clamp; and means, for causing the automatic return of said cutting means and said clamp to their initial positions.

4. In a machine for cutting strips, the combination of power driven means for continuously feeding said strips in a predetermined direction; means for severing said strips into predetermined lengths while said strips are in motion; means for clamping said strips during the severing operation; means actuated by said strips for moving said severing and clamping means in the direction of motion of said strips while said strips are being severed; and means for causing said severing and clamping means to move in a direction opposite to the direction of travel of said strips after each severing operation.

5. In a machine for cutting a plurality of strips, the combination of power driven means for continuously feeding said strips in a predetermined direction; means for severing said strips into predetermined lengths while said strips are in motion; means for clamping said strips during the severing operation; a transversely moving carriage on which said severing means is mounted; means actuated by said strips for moving said severing means, said clamping means and said carriage in the direction of motion of said strips while said strips are being severed; and means for causing said severing means and said clamping means to move in a direction opposite to the direction of travel of said strips after each severing operation.

6. In a machine for cutting continuously moving strips, the combination of a saw for cutting said strips into predetermined lengths; means actuated by said strips for clamping said strips adjacent the line of cut while being cut; and a carriage for moving said saw and said clamping means in the direction of travel of said strips during the cutting action.

7. In a machine for cutting continuously moving strips, the combination of a saw for cutting said strips into predetermined lengths; means actuated by said strips for clamping said strips while being cut; a carriage for moving said saw and said clamping means in the direction of travel of said strips during the cutting action; a second carriage supporting said saw mounted on said first named carriage; and means for returning the latter to its initial position after said saw has completed its cutting action.

8. In a machine for cutting strips, the combination of means for moving the strips to be cut; a saw for cutting said strips into predetermined lengths; means actuated by said strips for clamping said strips while being cut; means for moving said clamping means with the strips during the cutting operation; and a carriage for moving said saw in the direction of the length of said strips during its cutting action.

9. In a machine for cutting continuously moving material, the combination of means for clamping said material; means for cutting the material into lengths; carriage means for moving the clamping means and the cutting means in the direction of travel of said material; a target located in the path of travel of said material; and connections controlled by said target for causing said clamping and cutting means to move in a direction opposite to the movement of said material after the cutting operation is completed.

10. In a machine for cutting continuously moving material, the combination of means for clamping said material; means for cutting the material into lengths; carriage means for moving the clamping means and the cutting means in the direction of travel of said material; a target located in the path of travel of said material; and connections controlled by said target comprising a rocking arm and coacting parts for causing said clamping and cutting means to move in a direction opposite to the movement of said material after the cutting operation is completed.

11. In a machine for cutting sheets into boards, the combination of means for moving said sheets in a predetermined path; a vertically movable target in said path; a latch controlling said vertical movement; a carriage movable in a direction parallel to said path; a second carriage provided with a cutter mounted on said first named carriage movable in a direction across said path; and connections controlled by said target for moving said cutter in a direction parallel to said path after its cutting action is completed.

12. In a machine for cutting sheets into boards, the combination of means for moving said sheets in a predetermined path; a vertically movable target in said path; a latch controlling said vertical movement; a carriage movable in a direction parallel to said path; means for moving said carriage in opposite directions parallel to said path; a second carriage provided with a cutter mounted on said first named carriage movable in a direction across said path; means for reciprocating said second carriage across said path; and connections controlled by said target for moving said cutter in a direction parallel to said path after its cutting action is completed.

13. In a machine for cutting sheets into boards, the combination of means for moving said sheets in a predetermined path; a movable target in said path; a carriage movable in a direction parallel to said path; a second carriage provided with a cutter mounted on said first named carriage movable in a direction across said path; and connections comprising a cam and a clutch controlled by said target for moving said cutter in a direction parallel to said path after its cutting action is completed.

14. In a machine for cutting strips into boards, the combination of means for moving said strips in a predetermined path; a vertically slidable target in said path adapted to drop under the action of gravity when struck by a moving strip; a reciprocating carriage movable in a direction parallel to said path; a second reciprocating carriage provided with a cutter mounted on said first named carriage movable in a direction across said path; and connections controlled by said target for moving said cutter in a direction parallel to said path after its cutting action is completed.

15. In a machine for cutting strips into boards, the combination of means for forcibly moving said strips along a predetermined path; means to clamp said strips while moving in said path; a target in said path adapted to be moved by said strips; means movable across said path for cutting said strips into lengths; and connections controlled by the movements of said target for governing the movements of said clamping means and said cutting means.

16. In a machine for cutting strips into boards, the combination of means for forcibly moving said strips along a predetermined path; means to clamp said strips while moving in said path; a target in said path adapted to be moved by said strips; a carriage provided with a cutter movable in a direction across said path; and connections controlled by the movements of said target for governing the movements of said clamping means and said cutting means.

17. In a machine for cutting sheets into boards, the combination of means for forcibly moving said sheets along a predetermined path; a target in said path adapted to be moved by said sheets; a reciprocating carriage movable parallel to said path; a pair of sprocket chains for reciprocating said carriage; a second reciprocating carriage mounted on said first named carriage; a sprocket chain for reciprocating said second carriage transversely to and beneath said path; means carried by said second carriage movable across said path for cutting said strips into lengths; and connections controlled by the movements of said target for governing the movements of said last named cutting means.

18. In a machine for cutting strips into boards, the combination of means for forcibly moving said strips along a predetermined path; a target in said path adapted to be moved by said strips; means movable across said path for cutting said strips into lengths; automatic clamping means for holding said moving strips while being cut; and connections controlled by the movements of said target for governing the movements of said clamping means and said cutting means.

In testimony whereof I affix my signature.

TREADWAY B. MUNROE.